United States Patent [19]

Buvet et al.

[11] 4,062,745

[45] Dec. 13, 1977

[54] POLYCONJUGATED OXIDATION-REDUCTION POLYMERS, PROCESSES FOR THE ELECTRO-CHEMICAL REGENERATION OF

[75] Inventors: René Buvet, Cachan; Roger Vallot, Brunoy; Richard Messina, Boussy St. Antoine; Jacques Gal, Paris; Liang-Tsé Yu, Sucy en Brie, all of France

[73] Assignee: Agence Nationale de Valorisation de la Recherche (ANVAR), Neuilly-sur-Seine, France

[21] Appl. No.: 694,397

[22] Filed: June 9, 1976

[30] Foreign Application Priority Data

June 12, 1975 Germany ........................ 7518383[U]

[51] Int. Cl.² .......................... C25B 3/02; C25B 3/04
[52] U.S. Cl. .................................. 204/131; 204/73 R; 204/78
[58] Field of Search ........................ 204/78, 73 R, 131

[56] References Cited

U.S. PATENT DOCUMENTS

| | | | |
|---|---|---|---|
| 2,812,300 | 11/1957 | Pearson | 204/131 |
| 3,897,319 | 7/1975 | Anderson et al. | 204/78 |
| 3,925,172 | 12/1975 | Voorhies | 204/73 R |

Primary Examiner—R. L. Andrews
Attorney, Agent, or Firm—Browdy and Neimark

[57] ABSTRACT

The use of polyconjugated polymers having $\pi$-electrons which are delocalized throughout the macromolecular chain as oxidation-reduction polymers is described. The apparatus for regenerating such oxidation-reduction polymers comprises a column, at least one working electrode, an auxiliary electrode, a reference electrode, a potentiostat and a porous wall which separates the auxiliary electrode from the working electrode. Also disclosed is the use of the polymers in the oxidation and reduction of organic and inorganic substances.

9 Claims, 3 Drawing Figures

U.S. Patent    Dec. 13, 1977    4,062,745
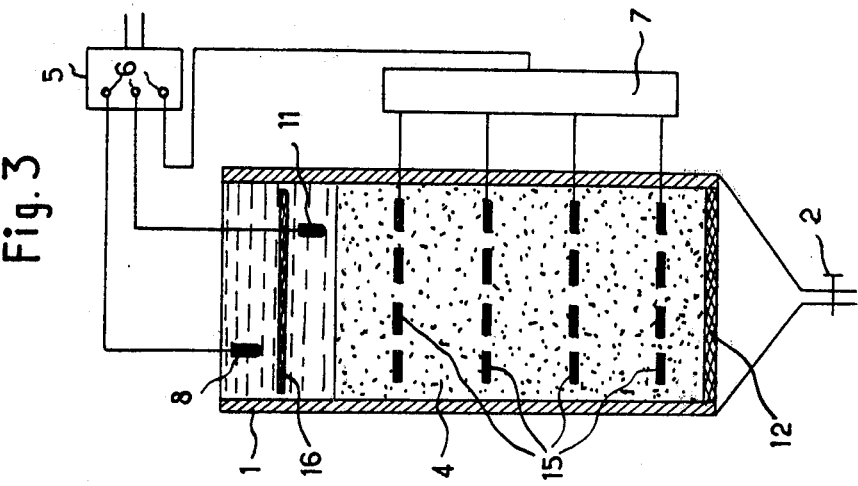
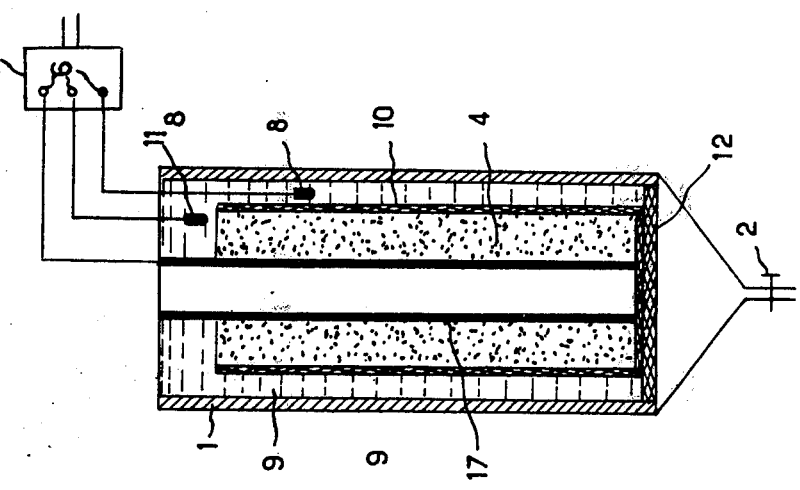
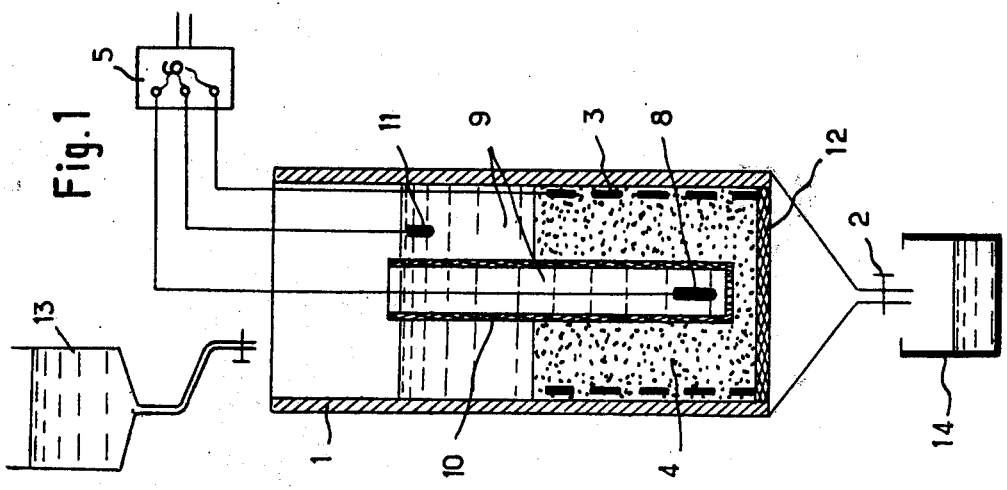

POLYCONJUGATED OXIDATION-REDUCTION POLYMERS, PROCESSES FOR THE ELECTRO-CHEMICAL REGENERATION OF

This invention relates to oxidation-reduction polymers, to a method and apparatus for regenerating oxidation-reduction polymers and to the use of the oxidation-reduction polymers in the oxidation or reduction of organic and inorganic materials.

The synthesis of oxidation-reduction polymers, which are also called redox polymers, electron-exchanger polymers or electrontransfer polymers, in the years 1950 – 1960 has greatly facilitated the execution of numerous operations of oxidation and reduction of organic or mineral substances, either in an aqueous medium or in another solvent.

For example, the elimination of oxygen from water and organic liquids (K.A. KUN Journal Polymer Sci. 3 1833 (1965)), the elimination of hydrogen-peroxide (B. SANSONI and E. BAUER-SCHREIBER, TALANTA 17, 987 (1970)), the treatment of wines (M. R. HERNANDEZ, La Semana Vitivinicola 1, 176 (1969)), etc., may be cited.

Most redox polymers proposed in the prior art are either vinyl polymers onto which quinone molecules have been grafted, or formol + phenol + hydroquinone condensation polymers. In all cases, and in order to render a process economically valuable, the polymer must be regenerated (either oxidized or reduced) after utilization. The prior art consequently proposed treating these polymers chemically, for example with $TiCl_3$ solutions.

Not only is this regeneration lacking in flexibility and difficult to control, but moreover, a fact which constitutes a major drawback, this regeneration greatly pollutes both the resin itself and the medium to be treated subsequently, in certain cases prohibiting the use of its very interesting electron-transfer properties. As a result of their constitution, that is to say as a result of their zero or very low electronic conductivity, the polymers known hitherto cannot be regenerated electro-chemically, that is to say by a method which is flexible, perfectly well controlled and controllable, and absolutely does not pollute.

Consequently the present invention has adopted the aim of providing for oxidation-reduction polymers which respond better to the necessities of practice than the previously known polymers having the same target, especially in that they have a structure such that their $\pi$ electrons are delocalized throughout the macromolecular chain and in that they consequently have an electronic conductivity which renders their electro-chemical regeneration possible and permits, by reason of the properties of the electro-chemically regenerated resins, of extending the applications of these latter to numerous fields where their use was previously greatly desired but very difficult in practice.

The present invention likewise relates to an apparatus and a process for electro-chemical regeneration of these polymers.

The present invention relates to oxidation-reduction polymers, characterized in that they are constituted by polyconjugated polymers.

According to a first advantageous manner of realization of the object of the present invention, these oxidation-reduction polymers are products of careful oxidation of aromatic amines, such as aniline for example, in acid medium.

According to a second advantageous manner of realization, these oxidation-reduction polymers are products of oxidation of nitrogen-containing heterocycles, such as, for example, pyrrole, in acid medium.

According to a third advantageous manner of realization these oxidation-reduction polymers are polyacene-quinones or condensation products obtained by reactions of the Friedel-Crafts type between an aromatic carboxylic dianhydride, such as, for example, pyromellitic dianhydride, and a quinone with condensed nuclei such as, for example, benzoquinone, naphthoquinone or anthraquinone.

According to a fourth advantageous manner of realization, these oxidation-reduction polymers are products of condensation between molten sulphur and a quinonic derivative such as, for example, tetrachloroquinone, naphthoquinone, para-benzoquinone, anthraquinone, or 1,5-dihydroxyanthraquinone.

The demi-reduction potential of these polyconjugated redox polymers according to the present invention is situated between 50 and 750 mV in relation to the hydrogen normal electrode (HNE) and their redox capacity, measured in mEq/g., varies between 0.5 and 5.

The present invention also relates to an apparatus permitting the electro-chemical regeneration of the oxidation-reduction polymers according to the present invention, characterized in that it is constituted by the association of a column or analogous tubular body of inert material, containing the material to be regenerated, and an electrolyte solution, with : - at least one controlled electrode or working electrode of chemically and electro-chemically inert but electronically conductive material which is in direct contact with the material to be regenerated, an auxiliary electrode or counter-electrode of chemically and electro-chemically inert but electronically conductive material which dips into the electrolytic solution and is separated from the working electrode and the polymers to be treated, by a porous wall, a reference electrode which dips into the electrolyte in the vicinity of the polymers to be treated, a three-terminal potentiostat which either imposes a constant potential of fixes the intensity of the reduction or oxidation current, and a porous wall which separates the auxiliary electrode from the working electrode and through which ions pass but which does not permit, the diffusion of chemical species in gas form produced in the course of the regeneration.

According to one particularly advantageous manner of realization, the working electrodes, when they are greater than 1 in number, are spaced from one another in the mass of polymer but connected to the potentiostat through the intermediary of a collector which connects or insulates the electrodes with or from one another.

This collector device, which renders possible the separate fixing of the potential of each of the working electrodes, permits the realization or partial and/or local regenerations.

According to another of its advantageous manners of realization the regeneration apparatus according to the present invention is equipped with an ammeter inserted in series into the circuit of working electrode - potentiostat - auxiliary electrode, and with a high-impedance voltmeter inserted between the reference electrode and the working electrode.

According to another advantageous feature, the column or analogous tubular body is provided with a stop cock of variable outlet rate.

According to an advantageous feature of the invention, the device according to the present invention is applicable to the oxidation and the reduction of materials by coulometric methods with imposed current density or potential.

The present invention also relates to a process for the electro-chemical regeneration of oxidation-reduction polymers. This process, which is carried out in the apparatus according to the invention, is characterized in that the polymer to be regenerated is introduced into the column, in that the electrolyte is introduced in such manner that the whole polymer is impregnated with it and covered by a sufficient layer so that an electrode may be dipped into it, and in that the potentiostat is set in operation either in intensiostatic coulometry or in potentiostatic coulometry.

According to an advantageous feature of the regeneration process, the polymer is introduced into the column in pulverized and/or micronized and/or granulated form and/or in the form of a diaphragm.

According to an advantageous manner of realization of the regeneration process forming the object of the present invention, the regeneration reaction is terminated when the potential is subjected to a sudden variation, in the case of intensiostatic regeneration.

According to another advantageous manner of realization of the regeneration process according to the present invention, the regeneration reaction is terminated when the resultant current is equal to the residual current, in the case of potentiostatic regeneration.

According to a particularly advantageous manner of realisation of the regeneration process according to the present invention, the electrolyte is added continuously into the column and flows through the outlet cock at a rate between 0.1 l./h. and 100 l./h. per kg. of polymer.

According to another manner of realization of the regeneration process, the current admitted in the case of the intensiostatic process is between 50 $\mu$A and 10 mA per sq. cm. of electrode.

According to another manner of realization of the process according to the invention, the quantity of polymers to be regenerated is between 0.01 and 20 g. per sq. cm. of working electrode.

According to another manner of realization of the process according to the invention, when the regeneration operation is terminated, the apparatus is emptied of the electrolyte and filled with the solution to be treated.

Apart from the foregoing features, the invention also includes other features which will appear from the following description.

The present invention relates particularly to the new polyconjugated oxidation-reduction polymers containing delocalized $\pi$-electrons throughout the macromolecular chain, the use of these polymers of oxidation-reduction operations, the electro-chemical regeneration of these polymers, the apparatus permitting the regeneration, in conformity with foregoing features, also the means adapted to the carrying out of these processes and to the realization of these apparatuses, installations and equipment, also the overall processes and the manufacturing lines which include the processes and apparatuses according to the present invention.

The invention can be better understood with the aid of the following supplementary description which refers to examples of oxidation and reduction of mineral and organic media with the aid of the polyconjugated oxidation-reduction polymers according to the present invention, to examples of realization of regeneration apparatuses represented in the accompanying drawing, and to examples of execution of the regeneration process.

However it must be clearly understood that the various examples of execution which will be described hereinafter, like the apparatuses described hereinafter and represented in the drawing, are given solely by way of illustration of the object of the invention, but in no way constitute a limitation thereof.

EXAMPLES OF UTILIZATION OF POLYCONJUGATED OXIDATION-REDUCTION POLYMERS FOR THE OPERATIONS OF OXIDATION AND REDUCTION.

EXAMPLE 1

Reduction of $Fe^{3+}$ on polypyrrole column.

11 g. of reduced polypyrrole of grain size between 200 and 500 $\mu$ are introduced into a column of 2 cm. diameter and 30 cm. height. The reducing capacity of the column thus constituted is 40 mEq. Then a $10^{-1}$ molar solution of $FeCl_3$ is passed at a rate of 0.6 l./h. At the end of 4 minutes a solution containing $10^{-1}$ of $FeCl_2$ is collected at the bottom of the column. The concentration of $FeCl_3$ in this solution is less than $10^{-3}$ M. At the end of 40 minutes of passage, the reduction capacity of the column is exhausted. The quantity of $FeCl_3$ reduced on the column, namely 39.7 mEq, corresponds to the reducing capacity of the column, which was 40 mEq, that is a yield greater than 99%.

EXAMPLE 2

Oxidation of stannous chloride on polyacenebenzoquinone column 15 g. of polyacene benzoquinone of grain size between 200 and 500 $\mu$ are introduced into a column of 2 cm. diameter and 30 cm. height. The oxidation capacity of the column thus constituted is 30 mEq. Then a $10^{-1}$ molar solution of $SnCl_2$ in acid medium (pH $\leq$ 1.5) is passed at a rate of 0.15 l./h. At the end of 15 minutes a solution containing $10^{-1}$ M of stannic chloride is collected at the bottom of the column. The $SnCl_2$ concentration of this solution is below $10^{-3}$ M. At the end of 2½ hours of passage the oxidation capacity of the column is exhausted and the total quantity of $Sn^{4+}$ collected is 29.5 mEq, that is a yield of 98.5%.

EXAMPLE 3

Oxidation of N-methyl nicotinamide.

11 g of powdered aniline black, the grain size of which is between 200 and 500 $\mu$, are introduced into a column of 2 cm. diameter and 30 cm. height. The oxidation capacity of the column thus constituted is 35 mEq. Then a solution of $10^{-2}$ M of N-methyl nicotinamide is passed. At the end of 15 minutes a solution of $10^{-2}$ M of oxidized N-methyl nicotinamide is collected at the bottom of the column. The total quantity of oxidized N-methyl nicotinamide collected at the end of the operation is 34.4 mEq, that is a yield of 98%.

The apparatus according to the present invention which carries out the electro-chemical regeneration of polyconjugated oxidation-reduction polymers will now be described with reference to the accompanying drawing wherein:

FIGS. 1 to 3 represent diagrammatically three forms of embodiment of the regeneration apparatus according to the present invention.

It must however be clearly understood that this drawing and the corresponding descriptive parts are given solely by way of illustration of the object of the invention, of which they in no way constitute a limitation.

FIG. 1 represents a column or tubular body 1 having at its base a variable-rate outlet cock 2 and equipped with a floor 12 of fritted glass or other material which permits passage of the solution but not the solids. The working electrode 3, which is made in the form of a cylindrical grid, dips into the polymer 4 to be regenerated and is connected to the potentiostat 5 by a terminal 6. The auxiliary electrode 8 dips into the electrolyte 9, is likewise connected to the potentiostat 5 by means of the terminal 6 and is separated from the polymers 4 to be regenerated by a porous wall 10, which permits the free passage of ions, but arrests the gases (for example hydrogen or oxygen) formed in the course of the regeneration. The reference electrode 11 dips into the electrolyte 9 in the vicinity of the polymers 4 and is likewise connected to the potentiometer 5 by the terminal 6. If desired, and in order to avoid manipulations and transferences of polyconjugated polymers, this apparatus can likewise serve for oxidation or reduction operations; for this purpose the electrolyte 9 is discharged through the cock 2 and the solution to be treated, contained in the reservoir 13, is introduced into the column and collected in the vessel 14.

If desired, and this is particularly advantageous, the reservoir 13 can serve to supply the regeneration apparatus with electrolyte throughout the regeneration operation, maintaining its flow rate within fixed limits, namely between 1 and 100 l./h. per kg. of polymer present.

The working electrode and the auxiliary electrode can have any geometric form: grid, plate, rod, solid cylinder, hollow cylinder, etc.

FIG. 2 represents a variant of embodiment of the regeneration apparatus according to the invention in which the working electrode 3 constituted by a grid as represented in FIG. 1 is replaced by an electrode 17 made in the form of a hollow cylinder.

FIG. 3 represents diagrammatically another advantageous form of embodiment of the apparatus according to the present invention. This comprises four superposed working electrodes 15 disposed substantially perpendicularly to the axis of the column 1 and distributed in the mass of polymer to be regenerated. These working electrodes 15 are connected to the potentiostat 5 through the intermediary of the collector 7 which permits of isolating one or more working electrodes. In this form of embodiment of porous wall 10 represented in FIG. 1 in the form of a cylinder open at its upper part is replaced by the porous plate 16 appropriately fixed upon the internal wall of the column 1.

A non-limitative example of electro-chemical regeneration carried out with the aid of the apparatus according to the invention will be found below.

INTENSIOSTATIC ELECTRO-CHEMICAL REGENERATION OF POLYPYRROLE WHICH HAS SERVED FOR THE REDUCTION OF $FeCl_3$.

10 g. of polypyrrole which has served for the reduction of $FeCl_3$ and therefore is in oxidized form are introduced into the regeneration apparatus. Then sulphuric acid is introduced, and when the whole of the polymer is covered with sulphuric acid, a flow of $H_2SO_4$ is maintained at a rate of 0.1 l./hour. Then a current of 50 mA is passed in such direction that the working electrode acts as cathode. The potential of the working electrode is followed. The potential diminishes slowly in the course of time. At the end of 18 hours it is noted that the potential drops sharply, thus indicating the end of the reduction. As soon as the tension stabilizes, the current is stopped, the sulphuric acid bath is removed and the regenerated polypyrrole is collected. The consumption of electricity during the period between the beginning of the passage of the current and the sharp drop in tension of the working electrode corresponds to $50 \times 3{,}600 \times 18 = 324$ coulombs, or 33.6 mEq. The reduction capacity of the initial polypyrrole (before the reduction of the $FeCl_3$) was 35 mEq; thus one obtains a regeneration yield of 96%.

It appears from the above description that whatever are the manners of execution, realization and application adopted, one obtains polyconjugated oxidation-reduction polymers the electroactive sites of which are accessible simultaneously to the reactants intervening in the reaction (ions, electrons), one obtains processes and apparatuses for either intensiostatic coulometric or potentiostatic coulometric electro-chemical regeneration which, in comparison with the previously known oxidation-reduction polymers and regeneration processes having the same aim, possess important advantages certain of which have already been mentioned above, and especially:

the advantage of permitting the use of oxidation-reduction polymers on a large scale and in numerous cases of reduction or oxidation, since the ease with which they can be regenerated and the cleanness of the electro-chemical regeneration permit their extension to very numerous fields of application;

the advantage of the possibility of continuous working, as the regeneration apparatus can serve perfectly well for the reduction or the oxidation treatment as desired;

the advantage of giving an excellent, practically quantitative yield, of the oxidations, reductions and regenerations; the advantage that it is possible to operate with only one and the same apparatus either for potentiostatic coulometric regeneration or for intensiostatic coulometric regeneration; the advantage of provision for a new range of insoluble oxidation-reduction polymers which can be used in all media, either liquid or gaseous, and the very high redox capacities of which are between 0.5 and 5 mEq/g. both in oxidation and in reduction, the redox procedure being reversible, which permits of subjecting these new polymers to a very great number of exchange cycles;

the advantage of being utilizable for the reduction or the oxidation of various substances, either mineral or organic, and among these of substances as diverse as the acids (as for example ascorbic acid), the alcohols (as for example ethyl or benzyl alcohol), the aldehydes (such as ethyl or propionic aldehyde), the amines (such as n-butanamine);

the advantage of being usable in all appropriate forms such as granules, powders or diaphragms;

the advantage of being usable, by reason of their insolubility, their mechanical resistance and their temperature resistance, under conditions necessitating filtration, centrifuging, etc, at all temperatures between 0 and 250° C.

As appears from the above, the invention is in no way limited to those of its manners of execution, realization and application which have just been described more explicity above; on the contrary it covers all variants thereof which may come to the mind of the person acquainted with the art, without departing from the scope or range of the present invention.

We claim:

1. Process for electro-chemical oxidation or reduction of correspondingly previously reduced or oxidized solid, water-insoluble, electrically conductive, polyconjugated oxidation-reduction polymers, to thereby regenerate such polymers, comprising:

introducing the polymer to be regenerated into a column or analogous tubular body of inert material having therein a working electrode and an auxiliary electrode, each of chemically and electrochemically inert but electrically conductive material, a porous wall separating the working electrode from the auxiliary electrode and through which ions may pass but chemical species in gaseous form produced in the course of the regeneration cannot pass, and a reference electrode;

introducing electrolyte into the column to an extent such that all of the polymer is impregnated with the electrolyte and is covered thereby with a sufficient layer for the reference electrode to dip thereinto;

connecting the electrodes to a 3-terminal potentiostat; and operating the potentiostat in either intensiostatic coulometry or in potentiostatic coulometry.

2. A process in accordance with claim 1 wherein said potentiostat is operated in intensiostatic coulometry.

3. Process for electro-chemical regeneration according to claim 2, in which the regeneration reaction is terminated when the potential is subjected to a sudden variation.

4. Process for electro-chemical regeneration according to claim 2, in which the current admitted is between 50 $\mu$A and 10mA per sq. cm. of electrode.

5. A process in accordance with claim 1 wherein said potentionstat is operated in potentiostatic coulometry.

6. Process for electro-chemical regeneration according to claim 5, in which the regeneration reaction is terminated when the resultant current is equal to the residual current.

7. Process for electro-chemical regeneration according to claim 1, in which the polymer is introduced into the column in powdered and/or granulated and/or micronized form and/or in the form of a diaphragm.

8. Process for electro-chemical regeneration according to claim 1, in which the electrolyte is added continuously into the column and flows at a rate between 1 l./h. and 100 l./h. per kg. of polymer.

9. Process for electro-chemical regeneration according to claim 1, in which the quantity of polymer to be regenerated is between 0.01 and 20 g. per sq. cm. of working electrode.

* * * * *

UNITED STATES PATENT OFFICE
CERTIFICATE OF CORRECTION

PATENT NO. : 4,062,745
DATED : December 13, 1977
INVENTOR(S) : BUVET et al.

It is certified that error appears in the above-identified patent and that said Letters Patent are hereby corrected as shown below:

Title page, [30] Foreign Application Priority Data
"Germany" should read --France--

Signed and Sealed this

Eleventh Day of July 1978

[SEAL]

Attest:

RUTH C. MASON
Attesting Officer

DONALD W. BANNER
Commissioner of Patents and Trademarks